Patented Aug. 12, 1952

2,606,900

UNITED STATES PATENT OFFICE 2,606,900

PHOSPHORIC ACID DERIVATIVES AND METHODS OF PREPARING THE SAME

Robert P. Parker, Somerville, Doris R. Seeger, Bound Brook, and Erwin Kuh, New Brunswick, N. J., assignors to American Cyanamid Company, New York, N. Y., a corporation of Maine No Drawing. Application July 25, 1951, Serial No. 238,581

8 Claims. (Cl. 260—239)

This invention relates to the preparation of new organic compounds. More particularly, it relates to phosphoric acid triamides and methods for their preparation.

It is well known in the prior art to prepare phosphoric acid triamide and its N,N',N''-trialkyl-, triaralkyl-, triaryl- and tripentamethylene substituted derivatives (G. M. Kosolopoff, Organophosphorous Compounds, 1950, pages 312-315).

The compounds of the present invention, in contrast to those of the prior art, are N-substituted N',N''-diethylenephosphoric triamides which may contain certain substituents on a ring-carbon atom of the ethylenimine rings. They may be represented by the following formula:

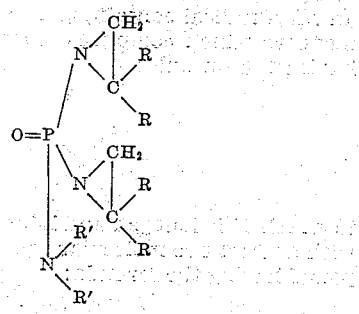

in which R represents hydrogen or a radical of the aliphatic, aliphatic-aromatic or aromatic series, and R' represents a radical of the aliphatic or cycloaliphatic series containing at least four carbon atoms.

The compounds of the present invention possess chemically reactive ethylenimine rings making them useful as textile chemicals; they may be polymerized to yield new plastics. However, it is surprising that the compounds of the present invention which contain the highly reactive ethylenimine ring are so stable that they may be used as therapeutic agents.

The compounds of the present invention are, in general, low melting solids to viscous liquids. While some of the lower members are water-soluble; as a class they are soluble in organic solvents and the higher members of the series possess marked lipid-solubility.

These compounds are prepared by starting with a trihalophosphoric acid such as phosphorous oxychloride or phosphorous oxybromide which is first reacted with a molecular equivalent of a secondary dialiphatic or dicycloaliphatic amine which replaces one of the halogen atoms. This intermediate monoamidodihalophosphoric acid is then reacted with two molecular equivalents of an ethylenimine compound to produce the desired phosphoric acid triamides of the present invention. These reactions may be illustrated by the following general equations:

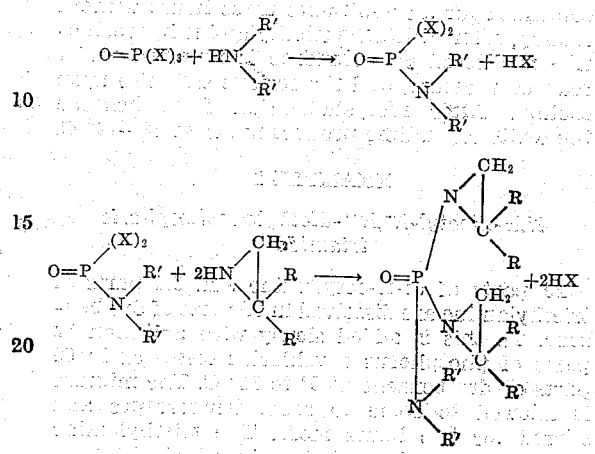

in which X is chlorine or bromine and R and R' are as previously defined. In this reaction the secondary dialiphatic or dicycloaliphatic amine used in the first step may be an amine such as: di-n-butylamine, diisobutylamine, diamylamine, diheptylamine, didodecylamine, butylhexylamine, and the like. The ethylenimines used in the second step may be compounds such as ethylenimine itself or C-substituted ethylenimines such as 2-methylethylenimine; 2,2-dimethylethylenimine; 2-ethylethylenimine; 2-propylethylenimine; 2-hexylethylenimine; 2-diethylethylenimine; 2-propyl-2-phenylethylenimine; 2-phenylethylenimine. These ethylenimine intermediates may be prepared by known procedures such as by ring closure with an alkali metal hydroxide of the corresponding 2-haloethylamine or sulfuric ester of the corresponding 2-hydroxyethylamine.

The reaction to prepare the compounds of the present invention is preferably carried out in an organic solvent such as benzene, ether, dioxane, and the like in the presence of a tertiary amine as acid acceptor such as triethylamine, N-ethylmorpholine or pyridine. The reaction can also be carried out in aqueous solution, and under these circumstances, the acid acceptor may be an alkaline substance such as an alkali metal carbonate or bicarbonate. The reaction is generally carried out at a temperature within the range of 0° C. to about 60° C. At this temperature range the reaction is generally complete within a period of a few minutes up to several hours. Isolation of the product from organic medium may be accomplished by filtration of the tertiaryamine hydrochloride salt and crystallization from the solvent or by evaporation of the organic solvent. If prepared in aqueous medium some members may be isolated by filtration, others must be extracted from the aqueous solution by the use of organic solvents. The procedure will vary with the individual members according to their solubility properties.

The following examples illustrate the preparation of the phosphoramides of the present invention. All parts are by weight unless otherwise indicated.

EXAMPLE 1

*N,N-diisobutyl-N',N''-dimethylenephosphoric triamide*

A solution of 24.2 parts of N,N-diisobutylamidodichlorophosphoric acid in 100 parts of dry benzene is added slowly to a mixture of 9.85 parts of ethylenimine, 21.65 parts of triethylamine and 100 parts of dry benzene at 10° C. Agitation is continued for an additional three hours without cooling, after which the triethylamine hydrochloride is filtered off. Benzene is removed under reduced pressure, and the residue solidifies upon cooling. After recrystallization from benzene the white crystalline product melts at 78°–79° C.

EXAMPLE 2

*N,N-dioctyl-N',N''-diethylenephosphoric triamide*

20 parts of di-n-octylamine and 8.4 parts of triethylamine are dissolved in 65 parts of dry benzene. To this is added slowly with agitation 12 parts of phosphorus oxychloride dissolved in 65 parts of dry benzene at 5° to 10° C. The mixture is allowed to come to room temperature and stirred for two hours more. The triethylamine hydrochloride is filtered off and washed with benzene. From the filtrate the benzene is removed by distillation under reduced pressure.

20 parts of the crude N,N-dioctylamidodichlorophosphoric acid is redissolved in 50 parts of dry benzene and added slowly to a solution of 11.4 parts of triethylamine and 4.8 parts of ethylenimine in 65 parts of dry benzene at 5° C. The reaction mixture is allowed to reach room temperature and the benzene is removed under reduced pressure. The product then distills at 168° at 0.3 mm. of mercury.

We claim:

1. Compounds of the group having the general formula:

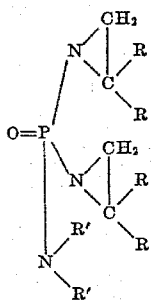

in which R is a member of the group consisting of hydrogen and lower alkyl radicals and R' is an alkyl radical containing 4 to 12 carbon atoms, inclusive.

2. Compounds of the group having the general formula:

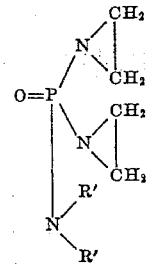

in which R' is an alkyl radical having 4 to 12 carbon atoms.

3. N,N-diisobutyl-N',N''-diethylenephosphoric triamide.

4. N,N-dioctyl-N',N''-diethylenephosphoric triamide.

5. A method of preparing compounds having the formula:

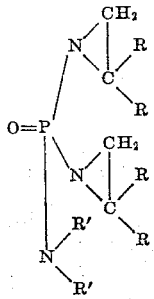

in which R is a member of the group consisting of hydrogen and lower alkyl radicals and R' is an alkyl radical containing 4 to 12 carbon atoms inclusive which comprises reacting a compound having the formula:

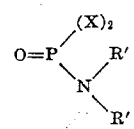

in which X is halogen and R' is as defined above with at least two molecular equivalents of a compound having the formula:

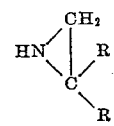

in which R is as defined.

6. A method of preparing compounds having the formula:

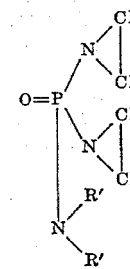

in which R' is an alkyl radical having 4 to 12 carbon atoms inclusive which comprises reacting a compound having the formula:

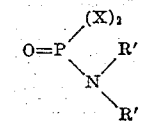

in which X is halogen, R' is as defined, with at least two molecular equivalents of ethylenimine.

7. A method of preparing N,N-diisobutyl-N',N''-diethylenephosphoric triamide which comprises reacting N,N-diisobutylamidodichlorophosphoric acid with ethylenimine in a hydrocarbon solvent in the presence of a tertiary amine and recovering said compound therefrom.

8. A method of preparing N,N-dioctyl-N',N''-diethylenephosphoric triamide which comprises reacting N,N-dioctylamidodichlorophosphoric acid with ethylenimine in a hydrocarbon solvent in the presence of a tertiary amine and recovering said compound therefrom.

ROBERT P. PARKER.
DORIS R. SEEGER.
ERWIN KUH.

REFERENCES CITED

The following references are of record in the file of this patent:

UNITED STATES PATENTS

| Number | Name | Date |
|---|---|---|
| 2,160,841 | Dreyfus | June 6, 1939 |
| 2,372,244 | Adams et al. | Mar. 27, 1945 |